US005750282A

United States Patent [19]
Chi et al.

[11] Patent Number: 5,750,282
[45] Date of Patent: May 12, 1998

[54] PROCESS FOR IMPROVING LITHIUM ION CELL

[75] Inventors: Ignacio Chi, Dracut; Karthik Ramaswami, Framingham; Han C. Kuo, Burlington; Christa Todino, Woburn, all of Mass.

[73] Assignee: Duracell Inc., Bethel, Conn.

[21] Appl. No.: 778,560

[22] Filed: Jan. 3, 1997

Related U.S. Application Data

[63] Continuation of Ser. No. 473,894, Jun. 7, 1995, abandoned.

[51] Int. Cl.[6] .......................... H01M 10/40; H01M 10/42
[52] U.S. Cl. .................... 429/49; 429/194; 429/218; 29/623.5
[58] Field of Search ............... 29/623.1, 623.5; 429/49, 50, 194, 198, 223, 224; 427/115

[56] References Cited

U.S. PATENT DOCUMENTS

| | | | |
|---|---|---|---|
| 4,318,969 | 3/1982 | Peled et al. | 429/194 X |
| 4,615,959 | 10/1986 | Hayashi et al. | 429/218 X |
| 5,028,500 | 7/1991 | Fong et al. | 429/194 |
| 5,153,082 | 10/1992 | Ogino et al. | 429/194 |
| 5,340,670 | 8/1994 | Takami et al. | 429/194 |

FOREIGN PATENT DOCUMENTS

| | | | |
|---|---|---|---|
| 92300286 | 7/1992 | European Pat. Off. | H01M 4/58 |
| 4-115458 | 4/1992 | Japan | H01M 4/02 |

OTHER PUBLICATIONS

Pistoia, G.; Industrial Chemistry Library, vol. 5, Lithium Batteries/New Materials, Developments and Perspectives (1994), pp. 1–9, 22–27.

Imanishi, N., Kashiwagi, T., Ichikawa, T.; J. Electrochem. Soc., vol. 140, No. 2, Feb. 1993; "Charge–Discharge Characteristics of Mesophase—Pitch—Based Carbon Fibers for Lithium Cells".

*Primary Examiner*—Anthony Skapars
*Attorney, Agent, or Firm*—Paul I. Douglas; Barry D. Josephs

[57] ABSTRACT

The efficacy of a passivating layer in a rechargeable lithium ion cell is increased by heating the charged cell and storing the charged cell for a pre-determined period of time.

17 Claims, No Drawings

1
PROCESS FOR IMPROVING LITHIUM ION CELL

This application is a continuation of application Ser. No. 08/473,894, filed Jun. 7, 1995, now abandoned.

BACKGROUND OF THE INVENTION

This invention relates to a rechargeable lithium cell. More particularly this invention relates to a rechargeable lithium cell which exhibits enhanced thermal stability due to the presence of an enhanced passivating layer.

Non-aqueous electrolyte cells using lithiated carbon as a negative electrode have attracted attention as high energy density batteries. With recent reduction in size and weight of various electronic devices, a demand has arisen for high energy density rechargeable batteries as power sources for various electronic devices. To meet this demand, much research has been conducted on lithium ion rechargeable batteries using carbon as a negative electrode material. The lithium ion rechargeable battery generally comprises a non-aqueous electrolyte in which a lithium salt is dissolved in a non-aqueous solvent, and a positive electrode containing an active material which topochemically reacts with lithium.

When a lithium ion cell is initially fabricated, it is in a discharged state. During the charging, the lithium comes out of the positive electrode and goes into the negative carbon electrode. However, a part of the lithium is used up in side reactions which cause the surface of the negative electrode to be coated. The film which is formed is essential because it prevents further reactions with the electrolyte. The Li+ ions during charging and discharging freely pass through this film.

This film is known as the passivating layer. In the charged state (lithiated), the carbon anodes used in a rechargeable lithium cell show exothermic reactivity with non-aqueous solvent electrolytes which are typically used in the rechargeable cell system. This reactivity is generally observed between a temperature of 100° C. to about 150° C. This exothermic activity leads to internal self heating and eventual failure of the cell. The lithium ion cells in the charged state tend to self heat when exposed to temperatures above about 100° C. It is believed that this self heating is caused by an exothermic reaction between the lithiated anode and the electrolyte. This causes the cell internal temperature to rise to unsafe levels where other exothermic processes may take place that could raise the temperature even higher. This passivating layer at the solid electrolyte interface (SEI) helps protect the cell from internal self heating.

It is an object of this invention to provide a process for increasing the efficacy of the passivating layer so that the thermal stability of a rechargeable lithium ion cell, in a charged state, is enhanced.

Other objects and advantages will become apparent from the following more complete description and claims.

SUMMARY OF THE INVENTION

Broadly, this invention contemplates a process for increasing the thermal stability of a rechargeable lithium cell which is in a substantially charged state and which has a passivating layer on a surface of one or both electrodes. The process comprises the steps of increasing the efficacy of the existing passivating layer by maintaining the charged lithium cell at a temperature from about 20° C. to about 75° C. for a period of time sufficient to increase the efficacy of the passivating layer.

DETAILED DESCRIPTION

In practicing the process of this invention, a passivating layer, which is the solid-electrolyte interface, is formed at the surface of one or both electrodes by the side reactions which take place when the lithium cell is charged.

The charged lithium cell is aged at a temperature of between about 20° C. and about 75° C. for a period of time sufficient to increase the efficacy of the passivating layer.

The temperature at which the charged lithium cell is maintained will vary depending upon the non-aqueous solvent used, the electrolyte used, and the composition of the anode and the cathode. These compositional factors contribute to a determination of the optimum temperature and time at which the secondary lithium cell is stored.

Generally speaking, in order to increase the efficacy of the passivating layer of a charged lithium cell, the charged cell may be maintained at a temperature of from about 20° C. to about 65° C. for a period of time of from about one hour to about two months.

For example, when the anode is a synthetic or natural graphitic carbon, the cathode is a lithiated metal oxide, the electrolyte salt is lithium hexaflourophosphate and the solvent is ethylene carbonate, the cell, after charging, may then be stored at a temperature of from about 45° C. to about 60° C. for a period of time of from about one hour to about seventy two hours in order to increase the efficacy of the passivating layer for increasing the heat stability of the rechargeable lithium cell.

Any rechargeable lithium cell, whether previously used or first being charged, may have the efficacy of its passivating layer increased to increase the heat stability of the cell by practicing the process of this invention.

In order to effectively practice the process of this invention, the cell, before being subjected to the process of this invention, must have been charged to between 10% of its maximum acceptable charge to about 100% of the cell's maximum acceptable charge. For example, after manufacture in the discharged state, the lithium cell will be charged, prior to practicing the process of this invention, to a partially or fully charged state. Full charge will generally be seen at about 4.0 to about 4.5 volts. It is also possible to partially charge as little as 10 percent of full charge, i.e., about 0.4 volt. Preferably, the cell is charged to an intermediate voltage such as between about 3.2 volts and about 4.0 volts and then the cell is aged in accordance with the teachings of this invention.

The negative electrode of the lithium ion cells of this invention is carbon. Any suitable form of carbon may be used for the negative electrode such as synthetic or natural graphite, mesophase, a soft or hard disordered carbon, and the like. The form of carbon used, while it will have an effect on the time and temperature at which the cell is stored in order to increase the heat stability of the lithium cell, is not critical and any suitable carbon may be used. Suitable carbons are well known to those skilled in the art.

The support for the carbon negative electrode may be selected from any suitable material such as nickel, copper, stainless steel, titanium, and the like. The carbon is held to the support by a suitable binder such as fluororesin, polyvinylidene fluoride, ethylene-propylene-diene copolymer, styrene-butadiene rubber, carboxymethylcellulose, and the like.

The binder, for example polyvinylidene fluoride is present in an amount of from about 1% to about 20% by weight of the positive or negative active electrode material, and preferably from about 5% to about 10% by weight. A conducting filler may also be present with the binder, such as acetylene black or graphite in an amount of from about 1% to about 20% of the weight of the binder and active electrode material and preferably from about 2% to about 5%.

The positive electrode of the cell is a lithiated metal oxide. Any lithiated metal oxide may be used such as one or more of titanium dioxide, nickel oxide, manganese dioxide, cobalt oxide, manganese oxide, or mixtures thereof. The lithiated metal oxide may be affixed to a support, using a suitable binder. The support to which the positive lithiated metal oxide electrode is affixed may be aluminum, aluminum alloys, titanium, stainless steel, and the like. Such supports are well known to those skilled in the art.

The electrolyte salt used in the cell is a lithium salt. Any suitable lithium salt may be used as the electrolyte such as lithium hexafluorophosphate, lithium perchlorate, lithium hexafluoroarsenate, lithium tetrafluoroborate, lithium trifluorosulfonamide lithium trifluorosulfonimide, and the like and mixtures of two or more of the same. It is preferred however, that the electrolyte be lithium hexafluorophosphate.

The electrolyte is dissolved in a non-aqueous solvent. The non-aqueous solvent may be selected from propylene carbonate, tetrahydrofuran, ethylene carbonate, diethyl carbonate, dimethoxyethane, gamma butyrolactone, dimethyl carbonate, ethyl methyl carbonate, and the like and mixtures of two or more of the same.

The electrolyte is generally dissolved in the solvent to constitute a solution which is from about 0.4 to about 2 Molar and preferably from 0.6 to about 1.5 Molar.

The separator between the negative and positive electrodes may be any suitable material such as a non-woven cloth of synthetic resin such as polytetrafluoroethylene, polypropylene, polyethylene or a woven porous body of such materials, or combinations of multi-layer composites.

The anode and cathode mixes (with a polymeric binder in appropriate liquid medium such as an organic solvent) in the form of a paste or slurry are separately coated onto a current collector grid, foil or mesh. This is then pressed into a sheet form, dried and cut to appropriate dimensions.

The cell may be fabricated into any suitable shape. The anode and cathode, with a suitable separator material electrically isolating them from each other, is then wound into a tight cylindrical or prismatic jelly roll configuration and inserted into a cell can. The cell can is then filled with the appropriate electrolyte, and then crimp sealed or welded shut.

In order to more fully illustrate the nature of this invention and the manner of practicing the same, the following examples are presented.

EXAMPLE ONE

The example demonstrates the improved thermal stability of a rechargeable lithium ion cell which is obtained when practicing the process of this invention compared to the relative thermal stability of a rechargeable lithium ion cell which has not been treated in the manner disclosed and claimed herein.

Eighty-five parts of the carbonaceous anode material (mesophase carbon) and five parts of carbon black are mixed with ten parts of poly vinylidene fluoride in isopropyl alcohol. The resultant paste or slurry is then coated on a copper grid current collector which is then dried, pressed into a sheet, and cut to appropriate dimensions.

The cathode is prepared by mixing ninety parts of the positive active material which is lithiated cobalt oxide (LiCo$_2$), with five parts of carbon black as a conducting filler. The binder, TEFLON (PTFE) (5 parts), and isopropyl alcohol are added, the composition is mixed and then coated on a collector which is an aluminum grid and formed into a sheet by drying and cutting the resultant material. The anode and cathode, with a separator (microporous polyethylene) electrically isolating them from each other is then wound into a tight cylindrical jelly roll configuration, and inserted into a cell can. The cell can is then filled with 1M LiPF$_6$ in EC/DMC (in equal parts by volume) and then crimp sealed. The cell is then charged to 4.1V volts and stored at 60° C., for 72 hours.

The fully charged cell is then cut open in a dry argon gas atmosphere, and the jelly roll is opened up. The anode and cathode are then separated from each other, rolled up alone, and the anode is inserted into a fresh empty can of the same size as the original that had been cut open. 1.5 cc's of electrolyte 1M LiPF$_6$ in EC/DMC is then added to the can which contains the anode. The can is then crimp sealed exactly as an actual cell would be. A thermocouple is welded to the external surface of the can to monitor the temperature. The sealed can is then subjected to UL 150° C. Oven Heating Test, which is a standard test, exactly as if they were complete cells.

COMPARATIVE EXAMPLE ONE

The above procedure is repeated except that the cell is not heated and stored to increase the efficacy of the passivating layer.

The results of the UL150° C. Oven Heating Test are set forth in Table 1.

TABLE 1

| HEATED AND STORED CELL Cell Temperature (°C.) | | UNTREATED CELL Cell Temperature (°C.) | |
|---|---|---|---|
| Time (Hours) | Anode | Time (Hours) | Anode |
| 0 | 42 | 0 | 25 |
| 0.2 | 54 | 0.2 | 70 |
| 0.4 | 130 | 0.4 | 100 |
| 0.6 | 154.8 | 0.6 | 376 |
| 0.8 | 130 | 0.8 | 130 |

Note: The maximum temperature reached for the anode is 154.8° C. at 0.6 hours.

Note: The peak temperature reached for the anode is 376° at 0.6 hours

EXAMPLE TWO

Example 2 further illustrates the advantages of using the method disclosed and claimed herein.

Electrodes are formed, and cells are constructed as in Example 1 except as described below.

The anode is formulated from 85 parts of the mesophase carbon, 5 parts of carbon black, and 10 parts by weight of polyvinylidene fluoride in N-methylpyrolidone (NMP). The resulting slurry is coated onto a copper foil current collector, dried, pressed, and cut to appropriate dimensions.

The cathodes are formulated from 87 parts of lithium cobalt oxide and 5 parts of carbon black mixed with 8 parts by weight of polyvinylidene fluoride in N-methylpyrolidone (NMP). The resulting slurry is coated onto a copper foil current collector, dried, pressed, and cut to appropriate dimensions.

Cell construction is as described in Example 1 and two cells are charged to full charge and then aged at 60° C. for 24 hours. A control cell is constructed (Comparative Example 2) in the same manner as the cells in Example 2, but the cell is not heat treated (aged).

The results of the UL150° C. Oven Heating Test on anodes obtained and handled as in Example 1 are shown in Table 2.

TABLE 2

| EXAMPLE 2 HEATED AND STORED CELLS Cell Temperature (°C.) | | | COMPARATIVE EXAMPLE 2 UNTREATED CELL Cell Temperature (°C.) | |
|---|---|---|---|---|
| Time (Hours) | Anode 1 | Anode 2 | Time (Hours) | Control Anode |
| 0 | 25 | 25 | 0 | 25 |
| 0.2 | 59 | 62 | 0.2 | 70 |
| 0.4 | 112 | 115 | 0.4 | 110 |
| 0.6 | 152.9 | 155.5 | 0.5 | 257.2 |
| | | | 0.6 | 155 |

Note: The maximum temperatures reached for the cells are 152.9° C. and 155.5° C. at 0.6 hours.

Note: The peak temperature reached for the control cell is 257.2° at 0.52 hours

The above examples clearly demonstrate that when one treats a charged cell, in accordance with the invention, at a temperature between about 20° C. and about 75° C. for a period of time between about 2 hours and 2 months the heat stability of the cell is remarkably increased.

While this invention has been described in terms of certain preferred embodiments, and illustrated by means of specific examples, the invention is not to be construed as limited except as set forth by the following claims.

We claim:

1. A process for increasing the thermal stability of a rechargeable lithium ion cell which is in a charged state wherein said lithium ion cell in said charged state has a negative electrode comprising carbon and lithium ions, a positive electrode comprising a lithiated metal oxide and an electrolyte comprising a metal salt in a non-aqueous solvent, and wherein said cell has a passivating layer on a surface of the carbon negative electrode; said process comprising the steps of maintaining said charged lithium ion cell at a temperature from about 45° C. to about 60° C. for a period of time of from about 1 hour to about 72 hours to increase the passivating efficacy of the carbon negative electrode passivating layer, said process having the effect of limiting exothermic reaction between electrolyte and said negative electrode upon exposure of said lithium ion cell to a temperature above about 100° C.

2. A process according to claim 1 wherein said lithium cell is fully charged, prior to maintaining said cell at said temperature, up to about 4.0V to about 4.5V.

3. A process according to claim 1 wherein the cell contains a negative electrode comprising lithiated carbon.

4. A process according to claim 1 wherein the lithium cell contains a negative electrode comprising mesophase carbon.

5. A process according to claim 1 wherein the lithium cell contains a negative electrode comprising synthetic or natural graphite.

6. A process according to claim 1 wherein the lithium cell contains a negative electrode which comprises soft or hard disordered carbon.

7. A process according to claim 1 wherein said lithiated positive electrode contains manganese dioxide.

8. A process according to claim 1 wherein said lithiated positive electrode contains at least one material selected from the group consisting of nickel oxides, cobalt oxides, manganese oxides, titanium dioxide, complex metal oxides, and mixtures thereof.

9. A process according to claim 1 wherein said negative electrode is affixed to a support selected from nickel, copper, stainless steel and titanium.

10. A process according to claim 1 wherein said positive electrode is affixed to a support selected from aluminum, aluminum alloys, titanium and stainless steel.

11. A process according to claim 1 wherein said cell contains an electrolyte comprising a lithium salt.

12. A process according to claim 1 wherein said cell contains an electrolyte comprising is lithium hexafluorophosphate.

13. A process according to claim 11 wherein said lithium salt is selected from lithium hexafluorophosphate, lithium perchlorate, lithium hexafluorarsenate, lithium tertrafluoroborate, lithium trifluorosulfonamide, lithium trifluorosulfonimide, and mixtures thereof.

14. A process according to claim 11 wherein said electrolyte salt is dissolved in a solvent selected from propylene carbonate, tetrahydrofuran, ethylene carbonate, diethyl carbonate, dimethoxyethane, gamma butyrolactone, dimethyl carbonate, ethyl methyl carbonate, dioxolane, butylene carbonate, and dimethyl formamide, and mixtures thereof.

15. A process according to claim 11 wherein said electrolyte is dissolved in an electrolyte solvent to make a solution having a concentration of electrolyte of from about 0.4 molar to about 2 molar.

16. A process according to claim 11 wherein said electrolyte is dissolved in an electrolyte solvent to make a solution of electrolyte of from about 0.6 molar to about 1.5 molar.

17. A lithium ion cell which has been treated in accordance with the method of claim 1.

* * * * *